United States Patent [19]
Jang

[11] Patent Number: 5,540,635
[45] Date of Patent: Jul. 30, 1996

[54] HYDRAULIC CONTROL SYSTEM OF A 4-SPEED AUTOMATIC TRANSMISSION FOR VEHICLE

[75] Inventor: Jaeduk Jang, Kyungki-do, Rep. of Korea

[73] Assignee: Hyundai Motor Company, Seoul, Rep. of Korea

[21] Appl. No.: 424,069

[22] Filed: Apr. 19, 1995

[30]    Foreign Application Priority Data

Apr. 19, 1994 [KR] Rep. of Korea .................. 94-8204
Apr. 19, 1994 [KR] Rep. of Korea .................. 94-8205

[51] Int. Cl.$^6$ ................................ B60K 41/10
[52] U.S. Cl. ........................................ 477/135
[58] Field of Search .................... 477/132, 135, 477/139, 140

[56]           References Cited

U.S. PATENT DOCUMENTS

| | | | |
|---|---|---|---|
| 3,752,009 | 8/1973 | Chana | 477/135 |
| 4,506,563 | 3/1985 | Hiramatsu | 477/154 |
| 4,576,065 | 3/1986 | Speranza et al. | 364/424.1 |
| 4,617,841 | 10/1986 | Sugano | 477/135 |
| 4,665,776 | 5/1987 | Sugano | 477/135 |
| 4,852,006 | 7/1989 | Speranza | 364/424.1 |
| 4,916,979 | 4/1990 | Irwin | 477/94 |
| 4,947,331 | 8/1990 | Speranza | 364/424.1 |
| 5,053,963 | 10/1991 | Mack | 364/424.1 |
| 5,274,553 | 12/1993 | Boardman | 364/424.1 |

*Primary Examiner*—Dirk Wright
*Attorney, Agent, or Firm*—Birch, Stewart, Kolasch & Birch, LLP

[57]           ABSTRACT

The present invention is directed to a hydraulic pressure control system of an automatic transmission for a vehicle includes a damper clutch control part for controlling a damper clutch to increase power train efficiency, a pressure regulating part for regulating line pressure generated from a hydraulic pump, and a shift control part for selectively supplying hydraulic pressure regulated at the pressure regulating part to friction members for applying more than one of the friction members in accordance with each speed ratio. The shift control part includes manual valve responsive to a shift lever, a shift control valve, controlled by two solenoid valves, for selectively feeding second, third, and fourth speed control pressures, a first pressure regulating valve for feeding drive pressure fed from the manual valve to one of the friction members, a first-to-second speed shift valve which is controlled by the second speed control pressure to feed drive pressure to another friction member, a second pressure regulating valve for feeding the second speed control pressure to another friction member, and a second-to-third/fourth-to-third speed shift valve controlled by the second speed control pressure to feed drive pressure to another friction member.

11 Claims, 13 Drawing Sheets

FIG.11

| MODE | S1 | S2 | PCSV-A | PCSV-B | S3 |
|---|---|---|---|---|---|
| N → D | OFF | ON | DUTY | OFF | OFF |
| N → R | OFF | ON | DUTY | OFF | OFF |
| 1ST | ON | ON | ON | OFF | OFF |
| 1 → 2 | OFF | ON | DUTY | OFF | OFF |
| 2ND | OFF | ON | OFF | OFF | DUTY |
| 2 → 3 | OFF | OFF | DUTY | OFF | OFF |
| 3TH | OFF | OFF | OFF | OFF | DUTY |
| 3 → 4 | ON | OFF | DUTY | DUTY | OFF |
| 4TH | ON | OFF | OFF | OFF | DUTY |
| 4 → 3 | OFF | OFF | DUTY | DUTY | OFF |
| 4 → 2 | OFF | ON | OFF | DUTY | OFF |
| 3 → 2 | ON | OFF | DUTY | OFF | OFF |
| 2 → 1 | ON | ON | ON | OFF | OFF |
| REV | ON | OFF | DUTY | OFF | OFF |
| L | ON | ON | OFF | OFF | OFF |

HYDRAULIC CONTROL SYSTEM OF A 4-SPEED AUTOMATIC TRANSMISSION FOR VEHICLE

BACKGROUND OF THE INVENTION

1. Field of the Invention

The present invention relates to the hydraulic control system of a 4-speed automatic transmission for a vehicle and, more particularly, to such a hydraulic control system for a four-speed automatic transmission which can enhance shift quality by alleviating shock caused by gear shifting and can improve responsiveness with respect to the gear shifting.

2. Description of Related Art

In general, an automatic transmission provides a necessary gear ratio to operate the vehicle under wide range of speeds and loads. It does this with a minimum amount of effort on the part of the driver. That is, automatic upshifts and downshifts are a convenience for the driver because a foot-operated clutch is not required to shift gears and because the vehicle can be brought to a stop without the use of a clutch and without shifting the transmission into neutral.

A conventional automatic transmission for a vehicle comprises a torque converter having an impeller, a turbine and a stator, a gear train connected to the torque converter to provide various forward speed ranges and reverse, a plurality of friction members such as disc clutches, one-way clutches which control gear action, and a hydraulic control system for controlling the operation of the friction members.

A hydraulic pressure control system of a 4-speed automatic transmission vehicle is described in U.S. Pat. No. 4,506,563. Since this system can not provide a skip shifting, e.g. from the fourth speed to the second speed, responsiveness with respect to a gear shift is retarded.

Additionally, the system described in U.S. Pat. No. 4,506,563 is designed such that only two predetermined modes of pressures, that is, pressure of a drive "D" range and pressure of a reverse "R" range, are fed to the pressure line, thereby occurring drive loss of the hydraulic pump and deteriorating the fuel consumption ratio.

Further, since the system described in U.S. Pat. No. 4,506,563 is designed such that the hydraulic pressure are simultaneously fed to a front clutch and a release chamber of a kick-down servo band brake, shock caused by gear shifting, especially, down shifting from a third speed ratio to a second speed ratio occurs.

SUMMARY OF THE INVENTION

Therefore, it is an object of the present invention to provide a hydraulic pressure control system of an automatic transmission for a vehicle which can alleviate shift shock by controlling line pressure according to duty ratio during gear shifting from the third speed to the fourth speed.

It is another object of the present invention to provide a hydraulic control system which provides a skip downshifting from the fourth speed to the second speed to improve responsiveness with respect to the gear shifting.

It is another object of the present invention to provide a hydraulic control system which can alleviate shift shock by controlling each friction member independently during gear shifting from the third speed to the second speed.

To achieve the above objects, the present invention provides a hydraulic pressure control system of an automatic transmission for a vehicle, comprising: a damper clutch control part for controlling a damper clutch to increase power train efficiency; a pressure regulating part for regulating line pressure generated from a hydraulic pump; and a shift control part for selectively supplying hydraulic pressure regulated at the pressure regulating part to first, second, third and fourth friction members for applying more than one of the friction members in accordance with each speed ratio; wherein the shift control part comprises: a manual valve responsive to a shift lever; a shift control valve, controlled by two solenoid valves, for selectively feeding second, third and fourth speed control pressures; a first pressure regulating valve for feeding drive pressure fed form the manual valve to the first friction members; a first-to-second speed shift valve which is controlled by the second speed control pressure to feed drive pressure to the second friction member; a second pressure regulating valve for feeding the second speed control pressure to the third friction member; and a second-to-third/fourth-to-third speed shift valve controlled by the second speed control pressure to feed drive pressure to the fourth friction member.

BRIEF DESCRIPTION OF THE DRAWINGS

The accompanying drawings, which are incorporated in the constitute a part of the specification, illustrate an embodiment of the invention, and, together with the description, serve to explain the principles of the invention.

FIG. 11 is a table showing the operation status of the solenoid valves used in the hydraulic control system shown in FIG. 1 for each mode;

DETAILED DESCRIPTION OF A PREFERRED EMBODIMENT

Figure 1:
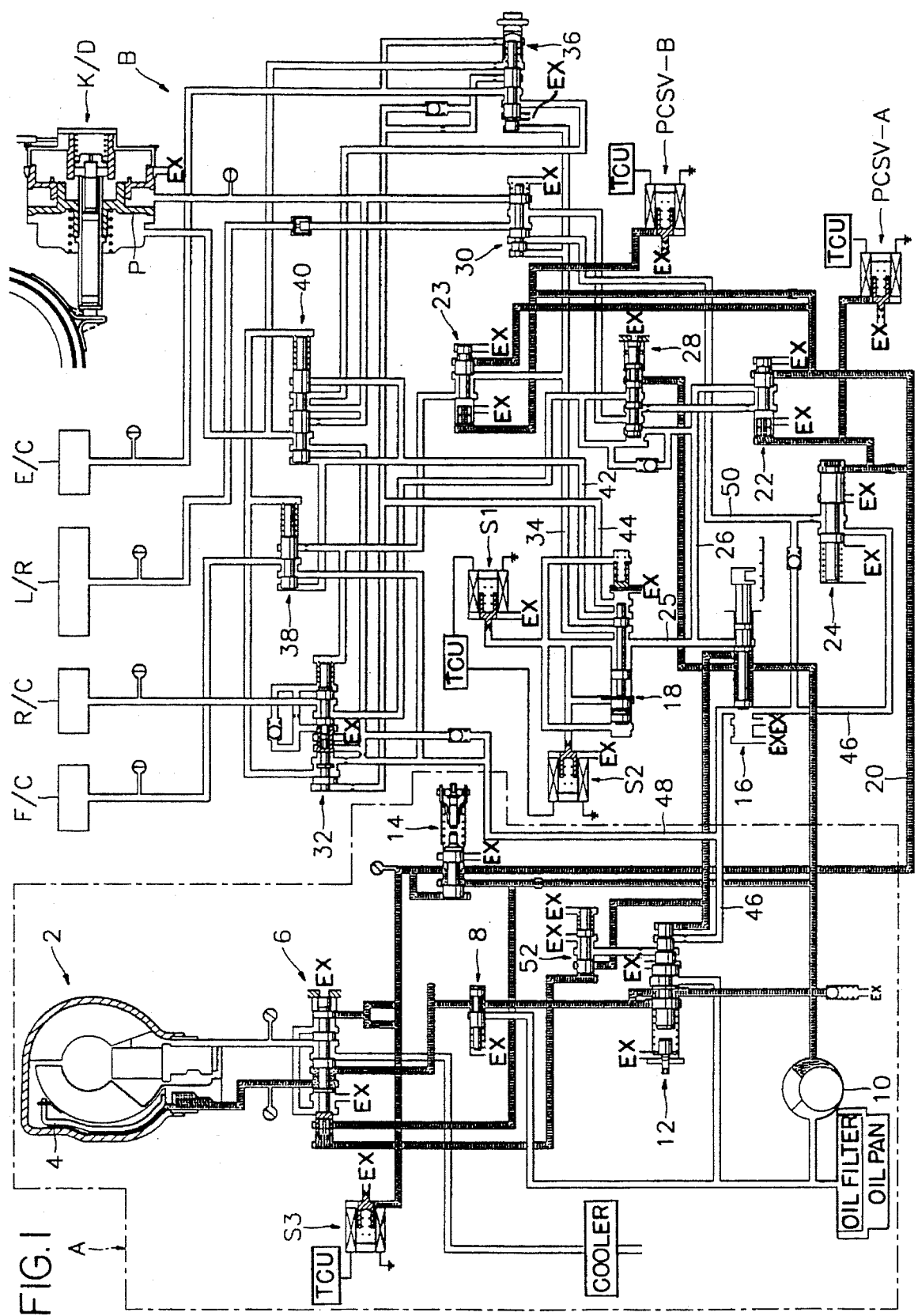
FIG. 1 is a view showing a hydraulic control system of an automatic transmission according to a first embodiment of the present invention.

A preferred embodiment of the present invention will now be described in detail with reference to the accompanying drawings.

Certain terminology will be used in the following description for convenience and reference only and will not be limiting. The words "right" and "left" will designate directions in the drawings to which reference is made.

As used herein a gear shifting directly from fourth speed ratio to second speed ratio is a skip downshifting wherein one speed ratio (i.e. 3rd speed ratio) is skipped.

FIG. 1 shows a hydraulic control system of an automatic transmission according to a first embodiment of the present invention.

The hydraulic control system comprises a damper clutch control part A including a torque convertor 2 connecting an engine crankshaft to a transmission input shaft, a damper clutch control valve 6 which controls the operation of a damper clutch 4 to increase power train efficiency, a torque converter control valve 8 for controlling hydraulic pressure for lubrication and operation of the torque convertor 2, a regulator valve 12 for regulating hydraulic pressure discharged from a hydraulic pump 10 in response to the requisition of the automatic transmission, and a reducing valve 14 for stably feeding hydraulic pressure from the hydraulic pump 10 to the damper clutch control valve 6.

The hydraulic control system further comprises a shift control part B including a manual valve 16 connected to an outlet of the hydraulic pump 10 to receive line pressure therefrom, a shift control valve 18 which is controlled to change fluid passages by two shift control solenoid valves S1 and S2 which are ON/OFF controlled by a transmission control unit (TCU), a first pressure regulating valve 22 for feeding drive pressure supplied from the manual valve 16 to a first friction member R/C, a first-to-second speed shift valve 30 for feeding drive pressure to a second friction member K/D, a second pressure regulating valve 23 for supplying hydraulic pressure to a third friction member F/C, and a second-to-third/fourth-to-third speed shift valve 40 for feeding drive pressure to a fourth friction member E/C.

The manual valve 16 operates in response to a position-(range) of a shift selector lever having six positions P, R, N, D, 2 and L.

Hydraulic pressure reduced by the reducing valve 14 is fed to a line 20 to control the positions of each first and second pressure regulating valve 22 and 23 in response to the duty control of pressure control solenoid valves PCSV-A and PCSV-B.

Further, the hydraulic pressure within the line 20 is designed to control an N-R control valve 24 for alleviating shock occurring when the manual valve 16 is shifted from the neutral position N to the reverse position R.

The manual valve 16 is connected by a drive pressure line 25 with the shift control valve 18. A first speed control line 26 branched off from the drive pressure line 25 extends to both the first pressure regulating valve 22 and an N-D control valve 28 for alleviating shock occurring when the manual valve 16 is shifted from the neutral position N to the drive D position, thereby supplying drive pressure to the first pressure regulating valve 22 and the N-D control valve 28.

Some hydraulic pressure within the first control line 26 is fed to the first-to-second speed shift valve 30 in response to the duty control of the pressure control solenoid valve PCSV-A and the other portion of the hydraulic pressure is fed to the first friction member R/C via a rear clutch exhaust valve 32 to apply the first friction member R/C.

The first-to-second speed shift valve 30 is designed to be controlled by control pressure fed from the shift control valve 18 through a second speed control line 34 such that hydraulic pressure fed from the N-D control valve 28 to the first-to-second speed shift valve can be selectively supplied to an apply chamber of the second friction member K/D and the end clutch valve 36.

Further, the hydraulic pressure within the second speed control line 34 is fed to an end clutch valve 36 to be used as control pressure and the other portion of the hydraulic pressure is fed to a front clutch valve 38 via the second pressure regulating valve 23 and then used to apply the third friction member F/C.

Further, a portion of the hydraulic pressure from the N-D control valve to the first-to-second shift valve 30 is designed to be supplied a release chamber of the second friction member K/D via the end clutch valve 40.

At this point, in accordance with the position of the end clutch valve 36, the hydraulic pressure fed to the end clutch valve 36 stops there or is fed to the fourth friction member E/C.

On the one hand, the front clutch valve 38 and the second-to-third/fourth-to-third speed shift valve 40 each of which is supplied with control pressure from the shift control valve 18 through a third speed control line 42 control the operation of the second friction member K/D and the third friction member F/C, respectively.

Further, the rear clutch exhaust valve 32 and the front clutch valve 38 each of which is supplied with control pressure from the shift control valve through a fourth speed control line 44 control the second-to-third/fourth-to-third speed shift valve 40 to exhaust the hydraulic pressure within the release chamber of the second friction member K/D and the hydraulic pressure which has been fed to the third friction member F/C.

And, to feed hydraulic pressure to the third friction member F/C and the fifth friction member L/R when the manual valve 16 is in the reverse range R, the manual valve 12 is connected by a branch line 48 of a reverse control pressure line 46 with the front clutch valve 38 and is also connected by a line 50 with the first-to-second speed shift valve 30.

The shift control part B controlling the five friction members as described above further comprises a line pressure variable means which detects the slip state of the friction members and regulates the line pressure to be optimum pressure.

The line pressure variable means has a solenoid valve S3 relating to the operation of the damper clutch control valve 6 and a high-low pressure valve 52 connected with the solenoid valve S3 to make its port change simultaneously with the port change of the damper clutch control valve 6, thereby regulating the opening of the exit port of the regulator valve 12.

Figure 2:
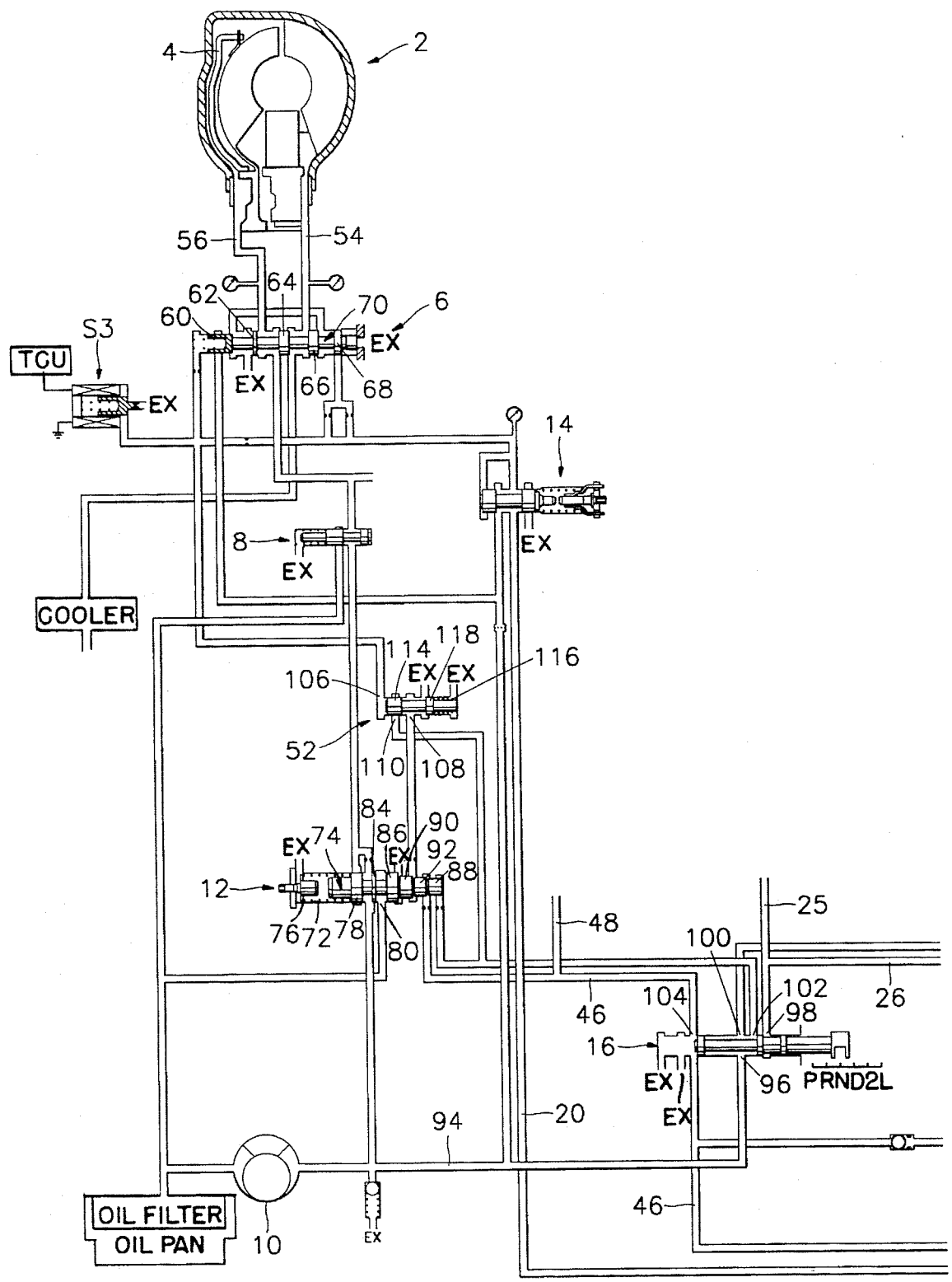
FIG. 2 is an enlarged view of the line pressure control part and the damper clutch control part of the hydraulic control system depicted in FIG. 1.

FIG. 2 is an enlarged view illustrating the damper clutch control part A, in which the damper clutch control valve 6 is connected with the torque converter 2 through a clutch apply line 54 and a clutch release line 56 to operate the damper clutch.

The damper clutch control valve 6 comprises a valve spool 70 having first, second, third, fourth and fifth lands 60, 62, 64, 66 and 68 and a plurality of ports each of which is connected with the torque converter control valve 8, the reducing valve 14, the high-low pressure valve 52 and the solenoid valve S3.

The pressure regulating valve 12 regulating line pressure produced from the hydraulic pump 10 comprises a valve spool 74 which is designed to be displaced towards the right or the left in a spool groove 72 of a valve body.

The valve spool 74 comprises a first land 78 biased by a spring 76, second and third lands 84 and 86 for regulating a returning amount of the hydraulic pressure fed from the hydraulic pump 10 to an oil pan 81 through a return port 80, a fourth land 88 for regulating line pressure in first and second speeds of the drive "D" range, and fifth land 90 for regulating the line pressure in third and fourth speeds of the drive "D" range, and a sixth land 92 for regulating the line pressure in the reverse "R" range.

The reducing valve 14 is disposed on the line pressure line 94 to feed reduced pressure to the damper clutch control valve 6 and the damper clutch control solenoid valve S3.

Further, the manual valve 16 which is designed to receive line pressure from the hydraulic pump 10 through the line pressure line 94 includes a first port through which the hydraulic pressure is fed from the hydraulic pump 10, a second port 98 through which hydraulic pressure comes the shift control valve in the drive, second and low "D", "2" and "L" ranges, a third port 100 through which the hydraulic pressure is fed to the N-D control valve 28 in the drive, neutral, and reverse "D", "N" and "R" ranges, a fourth port 102 for supplying the hydraulic pressure to the regulator valve 12 to act on the fourth and fifth lands 88 and 90, and a fifth port 104 for supplying hydraulic pressure to the sixth land 92 of the regulator valve 12.

The high-low pressure valve 52 is provided with a first port 106 communicating with damper clutch control solenoid valve S3 ad well as the damper clutch control valve 6, a second port 108 communicating with the pressure regulating valve 12, and a third port 108 communicating with the fourth port 102 of the manual valve 16.

Further, the high-low pressure valve 52 includes a valve spool 12 having a first land 114 for communicating the second and third ports 108 and 110 with each other in accordance with hydraulic pressure fed through the first port 106 and a second land 118 biased by the spring 116 against the hydraulic pressure at the first port 106.

Figure 3:
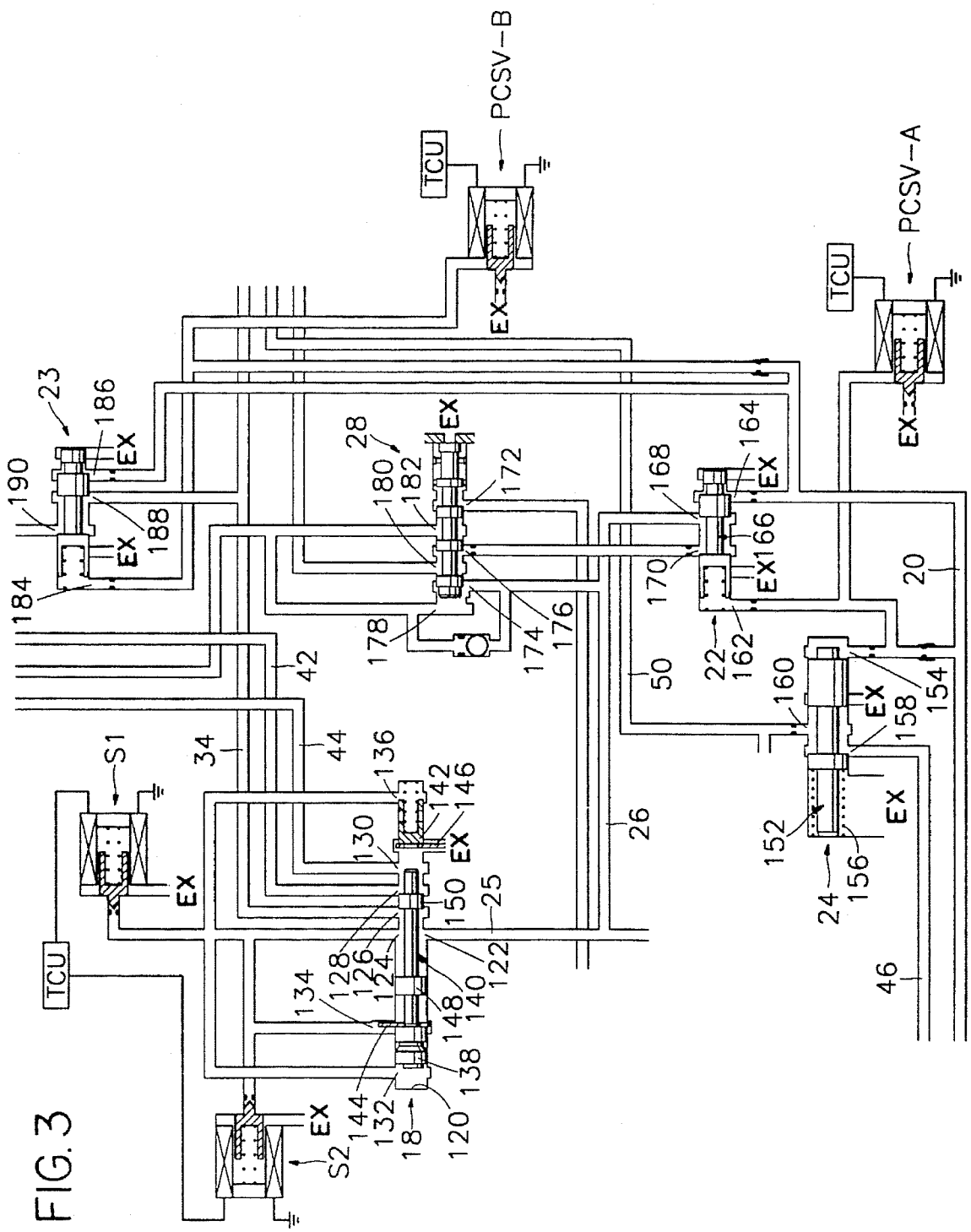
FIG. 3 is an enlarged view of a portion of the shift control part of the hydraulic control system depicted in FIG. 1.

FIG. 3 shows a portion of the shift control part shown in FIG. 1. The shift control valve 18 is connected with the manual valve through the line 25 and is ON/OFF controlled by the shift control solenoid valves S1 and S2 controlled by the transmission control unit TCU. Accordingly, the shift control valve 18 feeds hydraulic pressure fed through the line 25 to each shift valve and clutch valve as control pressure, such that drive pressure can be fed to each friction member.

To selectively apply the friction members, in this embodiment, the line 25 is directly connected with the first, second, third and fourth speed control lines 26, 24, 42 and 44 via the shift control valve 18.

The shift control valve 18 includes a first port through which the hydraulic pressure is fed to a valve spool groove 120, a second port,124 through which the hydraulic pressure are supplied to the shift control solenoid valves S1 and S2, a third port 126 for supplying the hydraulic pressure to the second speed control line 42, and a fifth port 130 through which the hydraulic pressure is supplied to the fourth speed control line 44.

The shift control valve 18 further includes sixth, seventh and eighth ports 132, 134 and 136 which selectively open and close as a portion of the hydraulic pressure leaving through the second port 124 is fed to the valve spool groove 120.

The shift control valve 18 comprises valve spools 138, 140 and 142 disposed in the valve spool groove 120 along a common axis, each of which is displace in accordance with hydraulic pressure coming through the sixth, seventh and eighth ports, a first stopper 144 disposed between the valve spools 138 and 140, and a second stopper 146 disposed between the valve spools 140 and 142.

Each stopper 144 and 146 is provided with a hole through which left and right ends of the valve spool 140 pass, respectively.

The valve spool 140 has a first land 148 and a second land 150 having a diameter smaller than that of the first land 148. The second land 150 selectively obstructs the third, fourth and firth ports 126 and 128 and 130.

The N-R control valve 24 receiving hydraulic pressure lower than the line pressure from the reducing valve 14 has a valve spool 152 which moves rightward and leftward in accordance with ON/OFF duty operation of the pressure control solenoid valve PCSV-A.

That is, in the low duty ratio, the valve spool 152 is displaces toward to left by the hydraulic pressure fed through the first port 154, and in the high duty ratio, moves rightward by elastic force of the elastic member 156.

This operation makes the hydraulic pressure fed to the second port 158 along the line 46 flow to the third port 160 or not such that the hydraulic pressure can be fed to the fifth friction member L/R through the line 50 or not.

The first pressure regulating valve 22 is provided with a first port 162 connected to the pressure control solenoid valve PCSV-A and a second port 164 communicating with the line 20. The pressure control solenoid valve PCSV-A controls the hydraulic pressure at the first port 162 to control the operation of the first pressure regulating valve 22.

The first pressure regulating valve 22 is further provided with third and fourth ports 168 and 170 selectively communicating with each other in accordance with the hydraulic pressure at the first and second ports 162 and 164 such that the hydraulic pressure fed to the third port 168 from the first speed control line 26 can be selectively fed to the N-D control valve 28.

The N-D control valve 28 includes a first port 172 for receiving control pressure from the manual valve 18, a second port 174 for receiving the hydraulic pressure for applying the first friction member R/C, and a third port for receiving the hydraulic pressure from the first pressure regulating valve 22. The N-D control valve 28 further includes fourth, fifth and sixth ports 178, 180 and 182 for feeding the hydraulic pressure fed through the second and third ports 174 and 176 to the first and second friction members R/C and K/D.

The second pressure regulating valve 23 is provided with a first port 184 connected to the pressure control solenoid valve PCSV-B and a second port 164 communicating with the line 20. The pressure control solenoid valve PCSV-B controls the hydraulic pressure at the first port 162 to control the operation of the second pressure regulating valve 23.

The second pressure regulating valve 23 is further provided with third and fourth ports 188 and 190 selectively communicating with each other in accordance with the hydraulic pressure at the first and second ports 162 and 164 such that the hydraulic pressure fed from the second speed control line 34 through the third port 168 can be selectively fed to the third friction member F/C through the fourth port 190.

Figure 4:
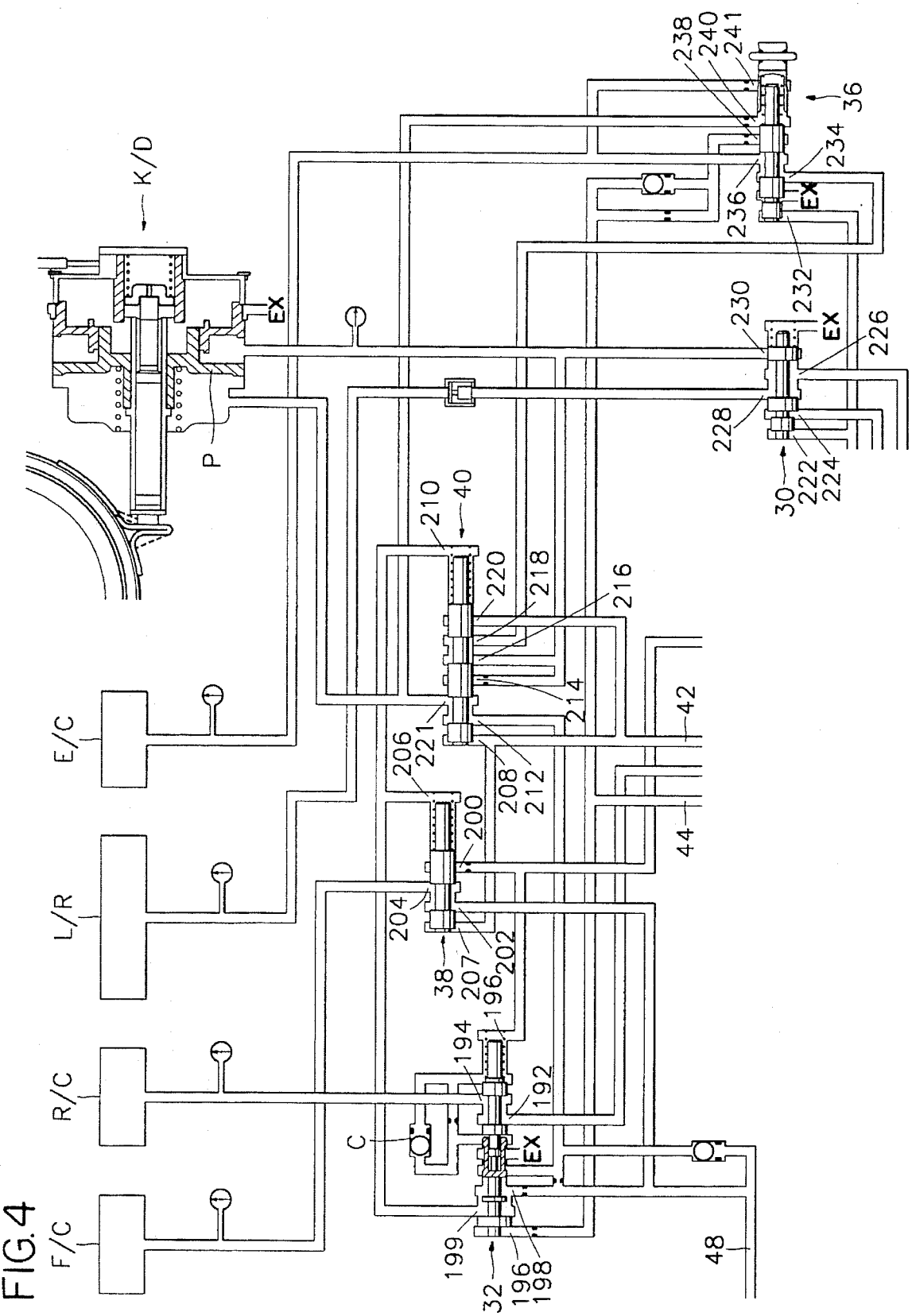
FIG. 4 is an enlarged view of the other portion of the shift control section of the hydraulic control system depicted in FIG. 1.

FIG. 4 shows the other portion of the shift control part B shown in FIG. 1. The rear clutch exhaust valve 32 receives the hydraulic pressure from the sixth port 182 of the N-D control valve 28 and feeds the hydraulic pressure to the first friction member R/C. The rear clutch exhaust valve 32 is provided with a first prot 192 through which the hydraulic pressure comes and second port 194 for feeding the hydraulic pressure at the first port 192 to the first friction member R/C.

The rear clutch exhaust valve 32 is further provided with a third port 196 for receiving control pressure from the second pressure regulating valve 23, a fourth port 44 for receiving control pressure from the fourth speed control line 44, a fifth port 198 for receiving hydraulic pressure through the first reverse control line 48, and a sixth port 199 connected to the front clutch valve 38.

The front clutch valve 28 feeds hydraulic pressure to the third friction member F/C to apply thereof in the third speed of the drive "D" range or feeds hydraulic pressure to the third friction member to apply thereof in the reverse range D. The front clutch valve 28 includes a first port 200 through which the hydraulic pressure comes from the second pressure regulating valve 23, a second port for receiving reverse applying pressure from the first reverse control line 48, and a third port 204 through which the hydraulic pressure at the first and second ports 200 and 202 is fed to the third friction member.

The front clutch valve 38 further includes a fourth port 206 communicating with the sixth port 199 of the rear clutch exhaust valve 32 to selectively communicating the second and third ports 202 and 204 with each other by using hydraulic pressure within the fourth speed control line 44 or the first reverse control line 48, and a fifth port 207 connected with the fifth port 207.

On the one hand, the second-to-third/fourth-to-third speed shift valve 40 is provided with a first port 208 through which control pressure comes from the fifth port 207 of the front clutch valve 38 along the third speed control lien 42, a second port 210 communicating with the fourth port 206 of the front clutch valve 38, a third port 212 for receiving the hydraulic pressure from the first reverse control line 48 in the reverse "R" range, and a fourth port 214 for receiving hydraulic pressure from the first-to-second speed shift valve 30.

The second-to-third/fourth-to-third speed shift valve 40 is further provided with a fifth port 216 for receiving the hydraulic pressure simultaneously with the fourth port 214, a sixth port 218 for feeding the hydraulic pressure comes through the sixth port 218 to the end clutch valve 36, a seventh port 220 for supplying the hydraulic pressure within the third speed control line 42 to the sixth port 218, and an eighth port 221 for supplying hydraulic pressure at the third and fourth ports 212 and 214 to the release chamber of the second friction member K/D.

The first-to-second speed shift valve 30 is provided with a first port 222 for receiving control pressure from the second speed control line 34, a second port 224 for receiving reverse pressure from the N-R control valve 24, and a third port 226 for receiving hydraulic pressure for applying the second friction member K/D from the N-D control valve 28.

The first-to-second speed shift valve 30 is further provided with fourth and fifth ports 228 and 230 for supplying the hydraulic pressure at the second and third ports 224 and 226 to the fifth and second friction members L/R and K/D, respectively.

The end clutch valve 36 includes a first port 232 for receiving control pressure from the second speed control line 34, a second port 234 for receiving the hydraulic pressure from the third speed control lien 42 via the second-to-third/fourth-to-third speed shift control valve 40, a third port 236 for feeding hydraulic pressure coming through the second port 234 to the fourth friction member E/C, a fourth port 238 which is an emergency port for feeding hydraulic pressure to the third port 236 when the valve spool malfunctions in the fourth speed.

The end clutch valve 36 further includes a fifth port communicating with the eighth port 221 of the second-to-third/fourth-to-third speed shift valve 40, and a sixth port 241 communicating with the third port 236.

In the hydraulic control system as described above, the transmission control unit (TCU) controls the solenoid valves and the pressure control solenoid valves to ON/OFF states or according to a duty ratio based upon the throttle valve position and the vehicle road speed such that the shift operation can be carried out as described hereinafter.

The engine drives torque converter 4 which drives the transmission input shaft (not shown) and hydraulic pump 4. At this point, hydraulic pressure produced by hydraulic pump 4 is directed to pressure the pressure regulating valve 12, torque converter control valve 8, damper clutch control valve 6, reducing valve 14, and manual valve 16.

Hydraulic pressure fed to the pressure regulating valve 12 is fed to torque converter 2 via the torque converter control valve 8 and the damper clutch control valve 6.

Hydraulic pressure fed to the reducing valve 16 is reduced to be lower than line pressure and is fed to the first pressure regulating valve 22 along the line 20.

Figure 5:
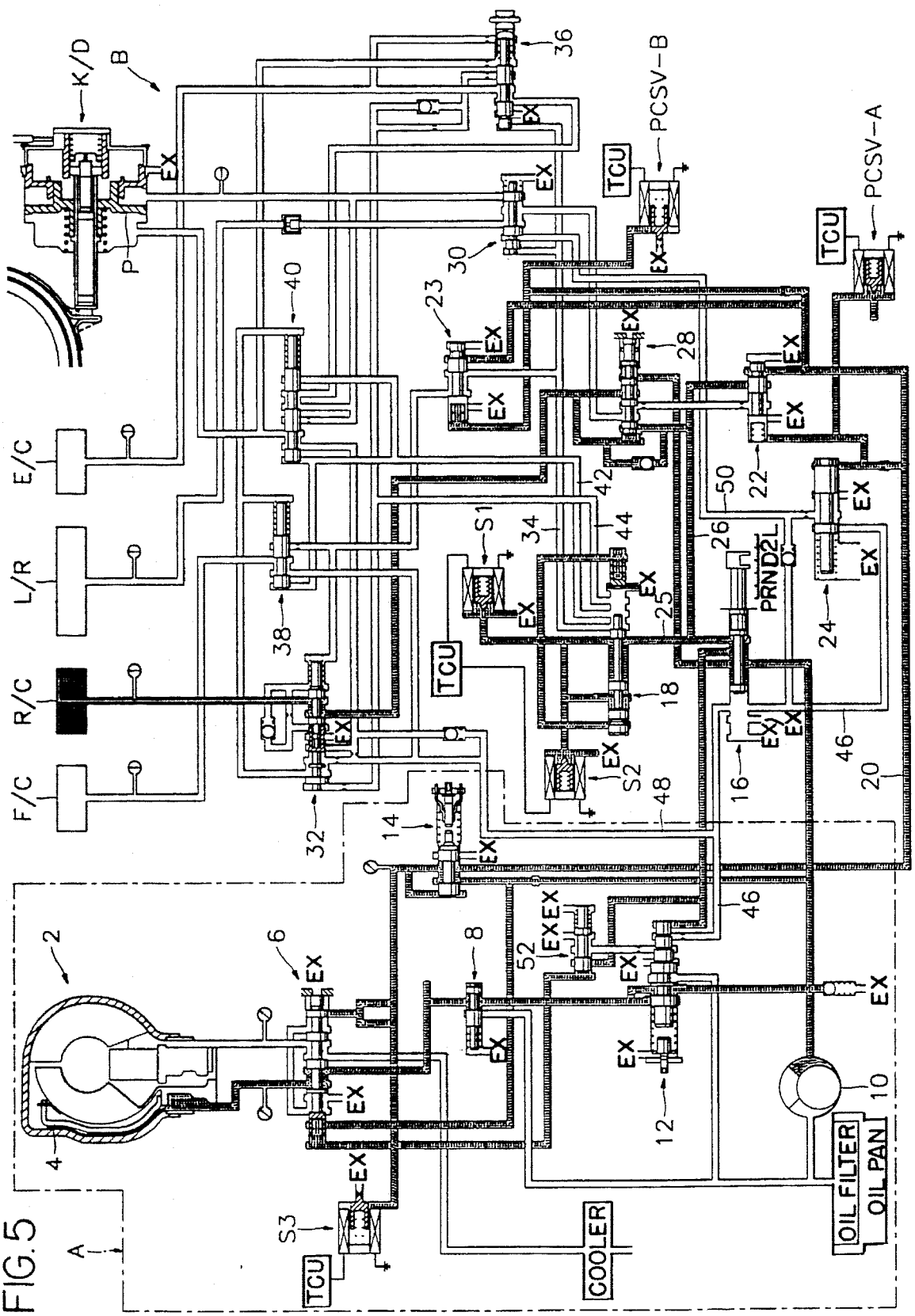
FIG. 5 is a view showing the location of hydraulic pressure when the hydraulic control system in accordance with the first embodiment of the present invention is at the first speed of the drive "D" range.

At this state, when the vehicle driver selects the drive "D" range of the shift select lever, the manual valve 16 interconnected with the shift select lever is shifted from a state shown in FIG. 1 to that shown in FIG. 5 to communicate the first and second ports 96 and 98 of the manual valve 16 with each other.

Accordingly, some hydraulic pressure coming through the first port 96 is fed through the second port 98 along the drive pressure line 25 and the first speed control line 26 to the first port 122 of the shift control valve 18, the second port 174 of the N-D control valve 28, and the third port 168 of the first pressure regulating valve 22. At this point, if vehicle speed is zero, the shift control solenoid valves S1 and S2 are controlled to OFF and ON states, respectively, and the pressure control solenoid valve PCSV-A is duty controlled to an OFF state by the TCU, as charted in FIG. 11 as the "N→D" operation mode.

At this point, hydraulic pressure fed from the third port 100 of the manual valve 16 to the N-D control valve 28 displaces the valve spool of the N-D control valve 28 towards the left.

By this operation, hydraulic pressure flowing along the first speed control line 26 is fed through the second and fifth ports 174 and 180 of the N-D control valve 28 to the first-to-second speed shift valve 30 and through the third and sixth ports 176 and 182 to the rear clutch exhaust valve 32.

At this point, some hydraulic pressure leaving through the sixth port 182 comes again through the fourth port 178 to act on the left end of the valve spool of the N-D control valve 28 (see FIG. 3).

In FIG. 5, also in FIGS. 1–11 described further herein, the shaded areas of the fluid lines represent lines in which fluid is flowing during the particular operation depicted by the circuit diagram.

First Speed Operation of the Drive "D" Range

FIG. 5 diagrams the operation of the hydraulic control system during the first speed of the "D" range.

As the vehicle speed and the throttle opening gradually increases, as charted in FIG. 11 as the "1ST" operation mode, the TCU starts to control shift control solenoid valves S1 and S2 to OFF states, such that no hydraulic pressure is fed to the second, third and fourth speed control lines 34, 42 and 44.

Further, the TCU controls the pressure control solenoid valve PCSV-A to an OFF state such that hydraulic pressure at the first port 162 of the first pressure regulating valve 22 is exhausted through an exit port Ex of the pressure control solenoid valve PCSV-A to displace the valve spool of the first pressure regulating valve 22 towards the left.

Accordingly, the third port 168 of the first pressure control valve 22 is completely obstructed such that no hydraulic pressure is fed to the fourth port 178 of the N-D control valve 28 to keep the position of the valve spool of the N-D control valve 28 to the rightward state.

As a result, the second and fourth ports 174 and 178 of the first pressure regulating valve 28 communicate with each other, and also the third and fifth ports 176 and 180 communicate with each other. Hydraulic pressure leaving through the port 178 is fed to the first friction member R/C via the rear clutch exhaust valve 32, thereby accomplishing the first speed of the drive "D" range.

At this point, since no hydraulic pressure flows along the second speed control line 34, hydraulic pressure leaving through the fifth port 180 of the first pressure regulating valve 28 stops at the third port 226 of the first-to-second speed shift valve 30.

Second Speed Operation of the Drive "D" Range

Figure 6:
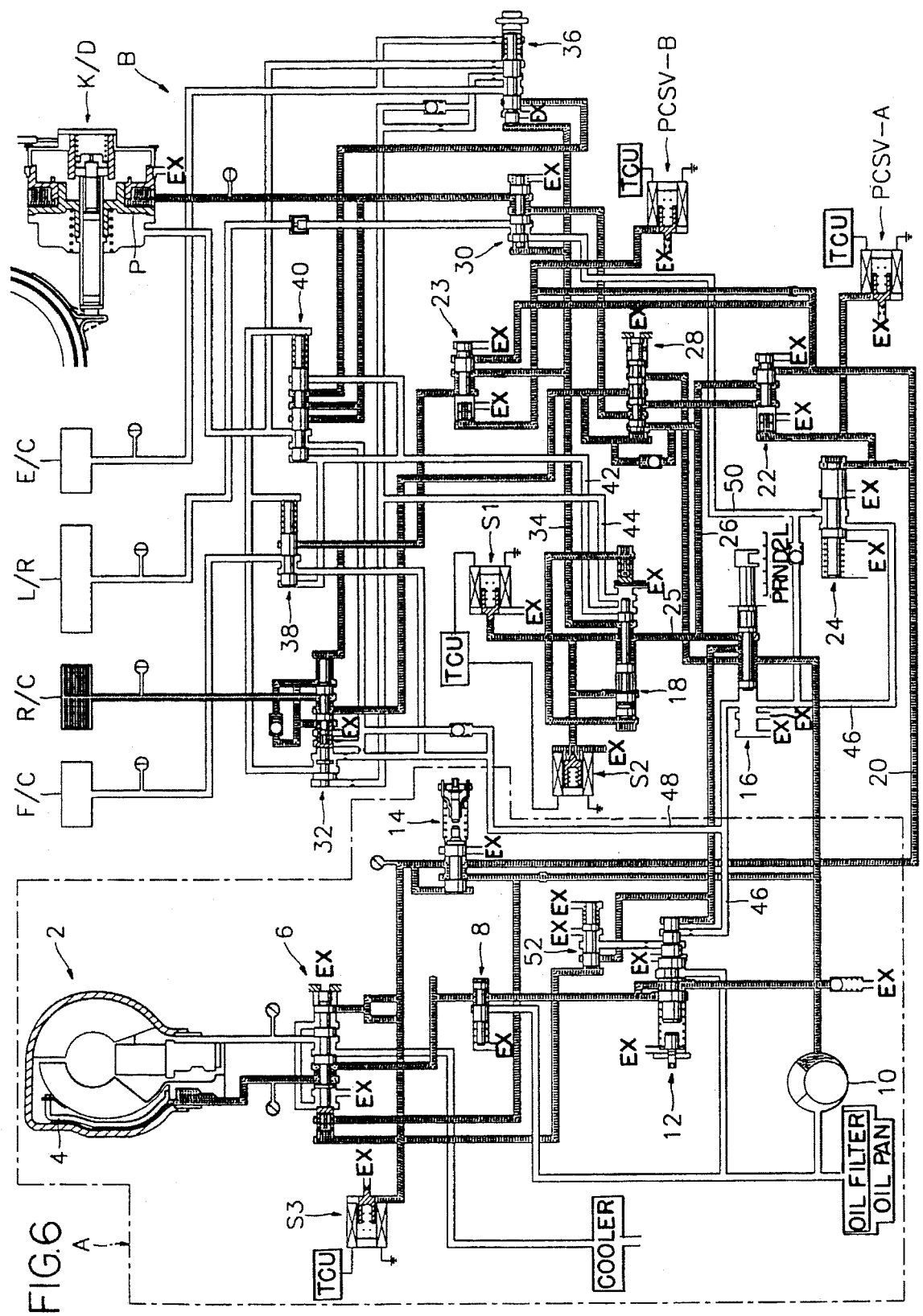
FIG. 6 is a view showing the location of hydraulic pressure when the hydraulic control system in accordance with the first embodiment of the present invention is at the second speed of the drive "D" range.

FIG. 6 diagrams the operation of the hydraulic control system during the second speed of the "D" range.

Figure 12:
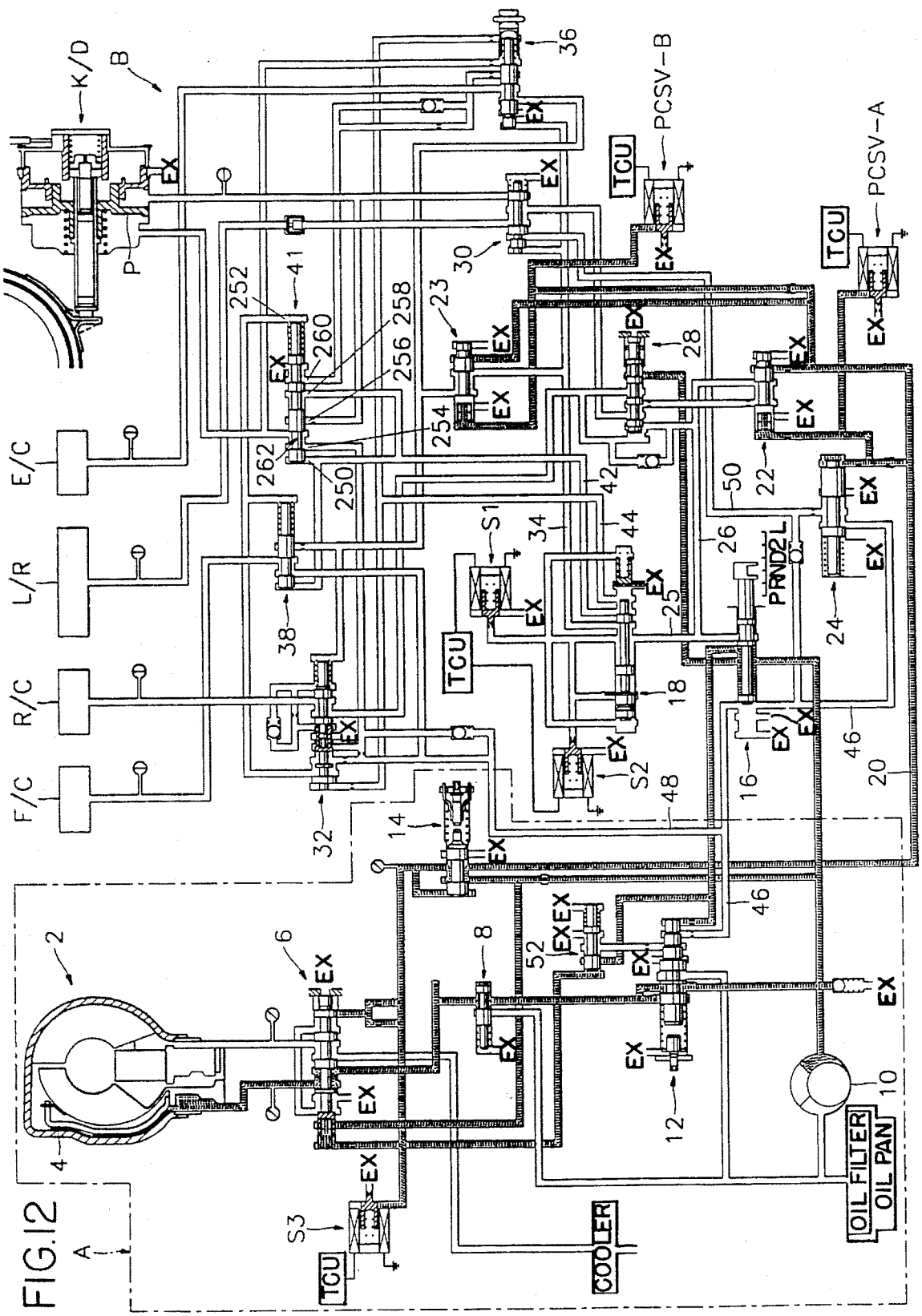
FIG. 12 is a view showing a hydraulic control system of an automatic transmission according to a second embodiment of the present invention.
Figure 13:
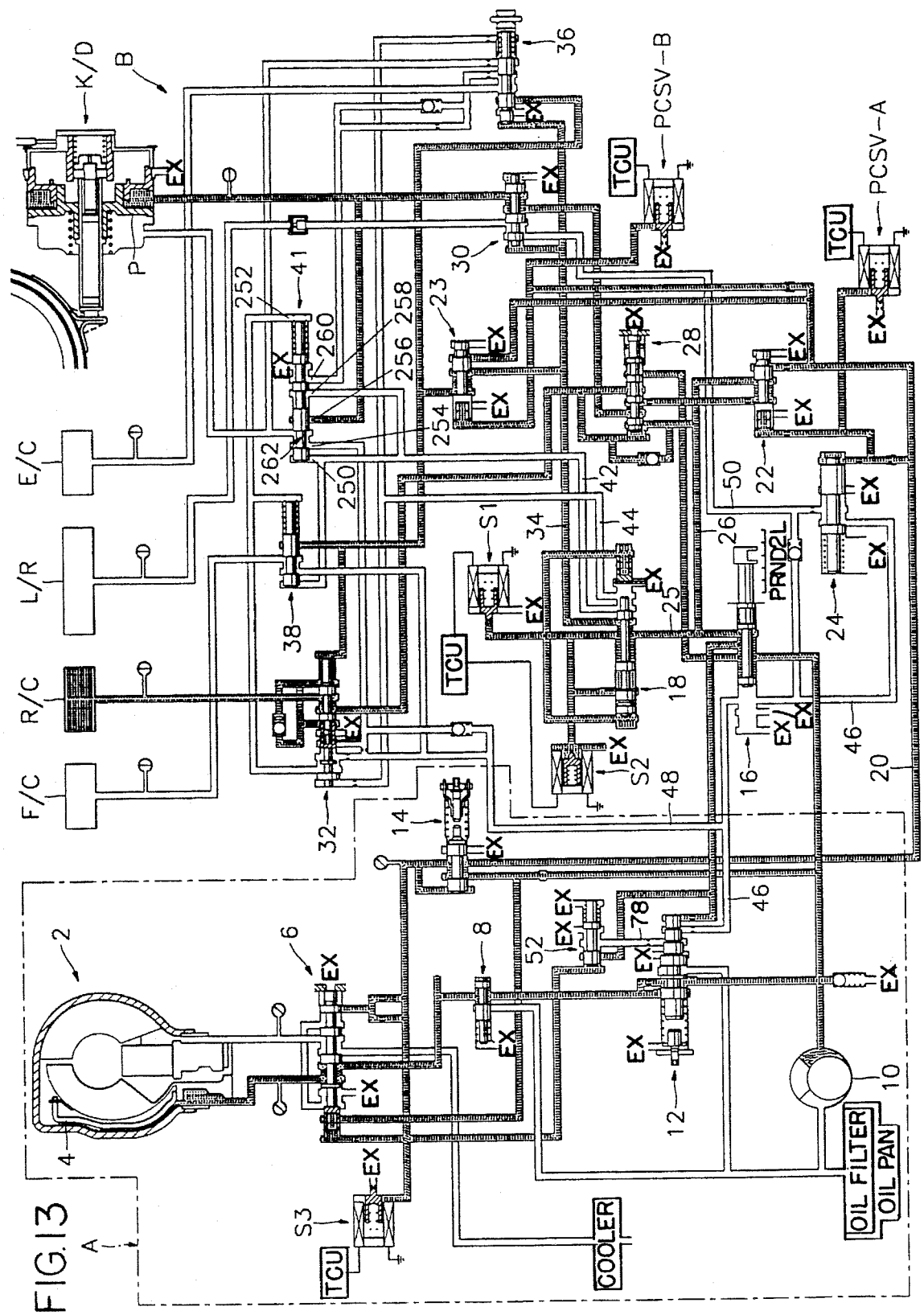
FIG. 13 is a view showing the location of hydraulic pressure when the hydraulic control system in accordance with the second embodiment of the present invention is at the skip shift from the fourth speed to the second speed.

As the vehicle speed and the throttle opening increase at the first speed state, the TCU starts to control the shift control solenoid valve S1 to an OFF state, as charted in FIG. 12 ad the "1→2" operation mode. This control feeds hydraulic pressure within the drive pressure line 25 to the second speed control line 34.

The hydraulic pressure flowing along the second speed control line 34 is fed to the first port 222 of the first-to-second speed shift control valve 30 and the first port 232 of the end clutch valve 36 to displace the valve spools thereof towards the right.

By this operation, the hydraulic pressure stopping at the third port 226 of the first-to-second speed shift valve 30 is fed to the apply chamber of the second friction member K/D through the fifth port 230.

Accordingly, the second friction member K/D in addition to the first friction member R/C which has been applied at the first speed of the drive "D" range is applied to accomplish the second speed.

Third Speed Operation of the Drive "D" Range

Figure 7:
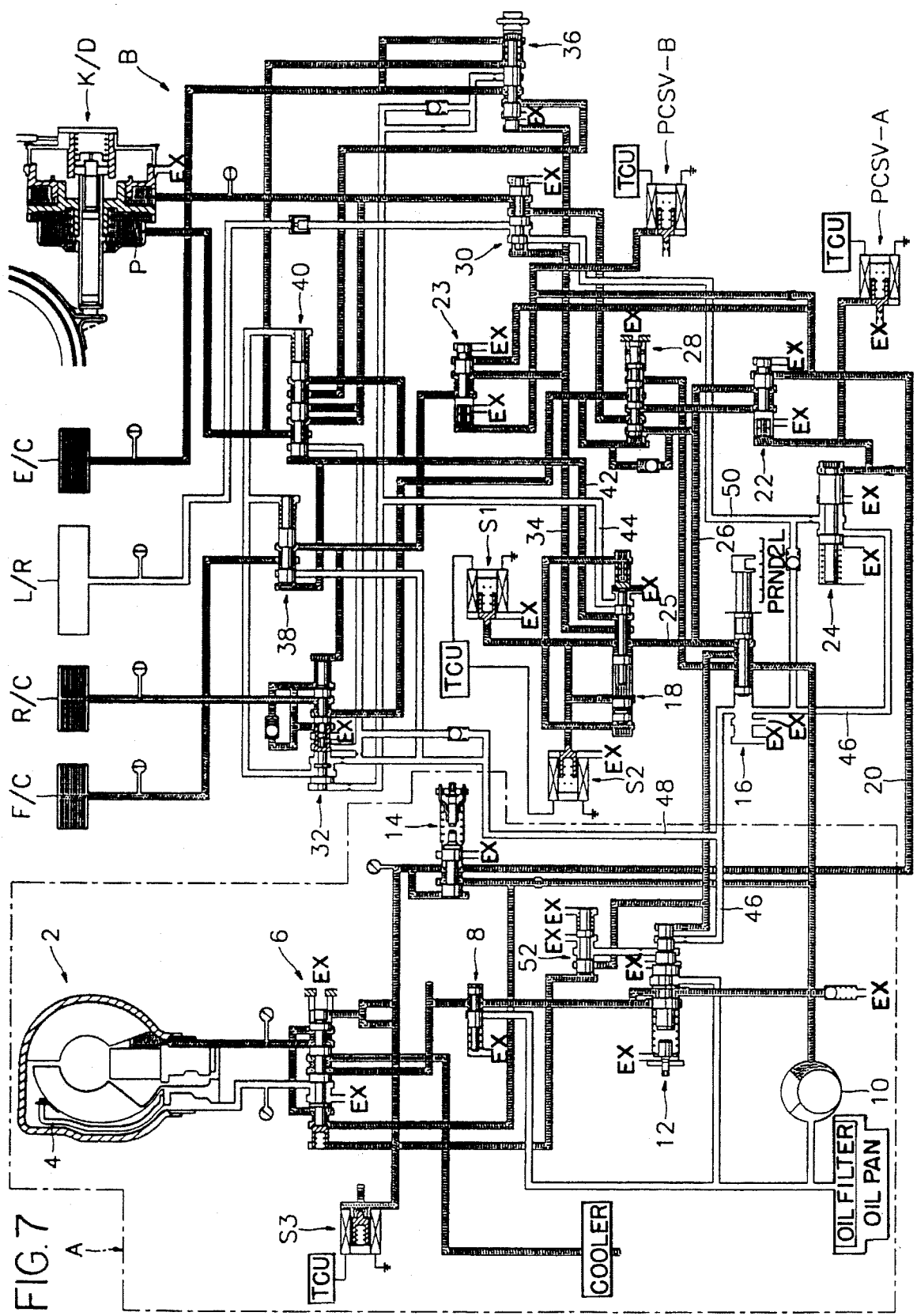
FIG. 7 is a view showing the location of hydraulic pressure when the hydraulic control system in accordance with the first embodiment of the present invention is at the third speed of the drive "D" range.

FIG. 7 diagrams the operation of the hydraulic control system during the third speed of the "D" range.

As the vehicle speed and the throttle opening increase further, the TCU starts to control the shift control solenoid valve S2 to an OFF state as charted in FIG. 11 as the "2→3" operation mode. By this operation, as shown in FIG. 7, hydraulic pressure is fed to the fifth port 207 of the front clutch valve 38 and the first port 208 of the second-to-third/fourth-to-third speed shift control valve 40 along the third speed control line 42 to displace the valve spools thereof towards the right.

By this operation, the first and third ports 200 and 204 of the front clutch valve 38 communicate with each other, and the fourth and eighth ports 214 and 221 of the second-to-third/fourth-to-third speed shift control valve 40 communicate with each other. Further, the sixth and seventh ports 218 and 220 of the second-to-third/fourth-to-third speed shift valve also communicate with each other.

Accordingly, hydraulic pressure flowing along the second speed control line 34 is fed to the third friction member F/C via the second pressure regulating valve 23 and the first and the front clutch valve 38.

At this point, hydraulic pressure fed to the second-to-third speed shift valve from the third speed control line 42 through the sixth port 218 leaves through the seventh port 220 and is fed to the fourth friction member E/C via the end clutch valve 36.

Further, hydraulic pressure fed to fourth port 214 of the second-to-third/fourth-to-third speed shift control vale 40 from the first-to-second speed shift valve 30 leaves through the eighth port 221 and is fed to the release chamber of the second friction member K/D. Although, hydraulic pressure are fed to both release and apply chambers of the second friction member K/D, since the pressure acting face of the release chamber is larger than that of the apply chamber, the second friction member K/D can be released.

As a result, the third speed where the first, third, and fourth friction members are applied is carried out.

Fourth Speed of the Drive "D" Range

Figure 8:
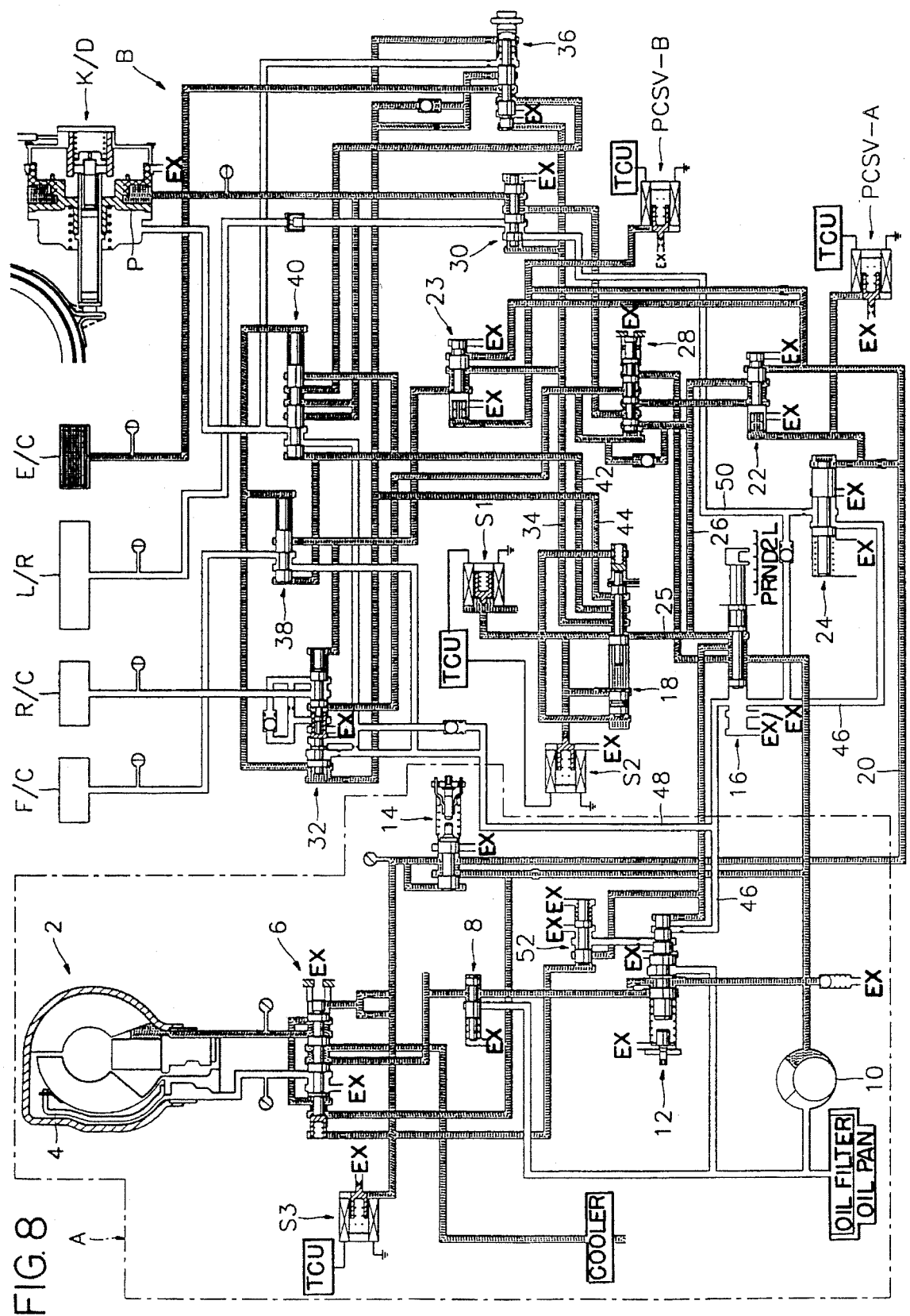
FIG. 8 is a view showing the location of hydraulic pressure when the hydraulic control system in accordance with the first embodiment of the present invention is at the fourth speed of the drive "D" range.

FIG. 8 diagrams the operation of the hydraulic control system during the fourth speed of the "D" range.

As the vehicle speed and the throttle opening increase further at the third speed, the TCU starts to control the shift control solenoid valve S1 to an ON state as charted in FIG. 11 as the "3→4" operation mode. By this operation, as shown in FIG. 8, hydraulic pressure is fed to all of the second, third and fourth speed control lines 34, 42 and 44 all of which communicate with the shift control valve 128.

By this control, hydraulic pressure flowing along the fourth speed control line 44 is fed to the third port 196 of the rear clutch exhaust valve 32 to displace the valve spool thereof towards the right and is then fed to the fourth port 204 of the front clutch valve 38 and the second port 210 of the second-to-third/fourth-to-third speed shift control valve 40.

By this flow of the hydraulic pressure, the second and third ports 202 and 204 of the front clutch valve 38 is to communicate with each other such that the hydraulic pressure which has been fed to the third friction member F/C is exhausted through the exit port EX of the manual valve 16 along the first reverse control line 48.

Further, the hydraulic pressure which has been fed to the first friction member R/C via the rear clutch exhaust valve 32 is exhausted through the exit port Ex through the bypass passage C of the rear clutch exhaust valve 32.

Further, the hydraulic pressure which has been fed to the release chamber of the second friction member K/D is exhausted along the same path of the hydraulic pressure of the third friction member E/C through the third and eighth ports 212 and 221 of the second-to-third/fourth-to-third speed shift control valve 40.

Accordingly, the second friction member K/D is to be applied again, and the fourth friction member E/C maintains its applied state, thereby accomplishing the fourth speed.

During these shifting operations, hydraulic pressure leaving through the fourth port 102 of the manual valve 16 acts on the fourth land 88 of the hydraulic pressure regulating valve 12 to displace the valve spool of the manual valve 16 towards the left.

By this operation, the opening of the return port 80 increases and thus line pressure decreases in proportion to the increase of the return point opening.

Further, at the third and fourth speeds of the drive "D" range, the TCU controls the solenoid valve S3 according to the duty ratio. That is, in case the line pressure is much low such that the slip occurs at each friction member, the solenoid valve S3 is duty controlled to an OFF state by the TCU to increase the line pressure, and in case the slip does not occurs at each friction member, the solenoid valve S3 is duty controlled to an ON state by the TCU to reduce the line pressure.

That is, when the solenoid valve S3 is duty controlled to an OFF state, relatively high hydraulic pressure is fed to the first port 106 of the high-low pressure valve 52 to displace the valve spool of the high-low pressure valve 52 towards the right such that the first land 114 obstructs the second and third ports 108 and 110 thereof.

By this operation, hydraulic pressure fed to the third port 110 of the high-low pressure valve 52 from the manual valve 16 stops there, such that line pressure fed to the pressure regulating valve 12 is only the hydraulic pressure acting on the fourth land 88 of the pressure regulating valve 12.

However, when the solenoid valve S3 is duty controlled, hydraulic pressure which has been fed to the first port 106 of the high-low pressure valve 52 is exhausted, the valve spool of the high-low pressure valve 52 is biased to the left by the spring 116.

As a result, the second and third ports 108 and 110 of the high-low pressure valve 52 communicate with each other such that the hydraulic pressure stopping at the third port 110 is fed to the pressure regulating valve 12 through the second port 108 and acts on the fifth and sixth lands 90 and 92 of the pressure regulating valve 12.

At this point, since the pressure apply face of the fifth land 90 is larger than that of the sixth land 92, the valve spool of the pressure regulating valve 12 is displaced towards the left.

By this operation, the return port 80 is completely opened to increase the exhaust amount of the oil, thereby reducing line pressure.

Reverse "R" Range Operation

Figure 9:
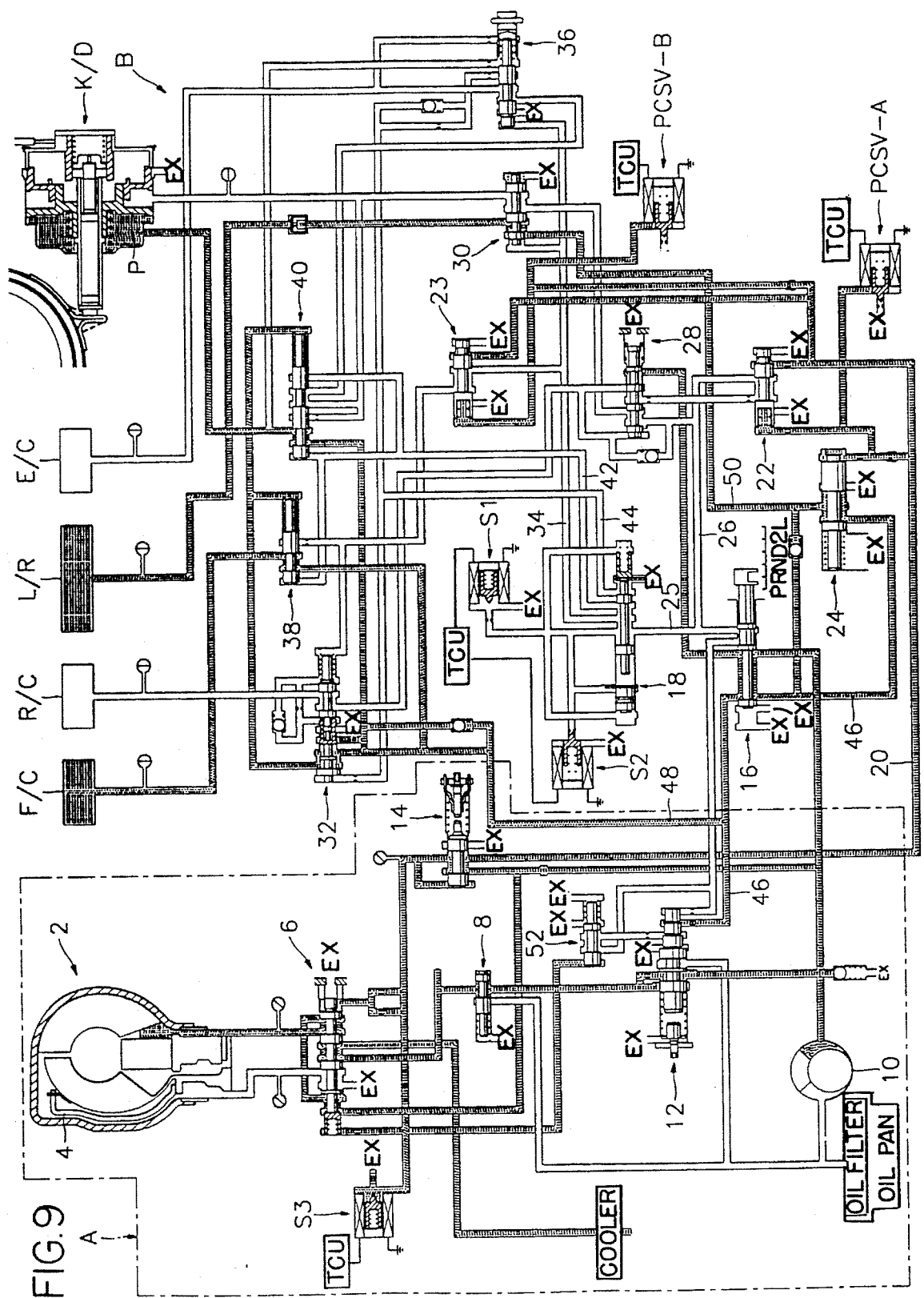
FIG. 9 is a view showing the location of hydraulic pressure when the hydraulic control system in accordance with the first embodiment of the present invention is at the reverse "R" range.

When the shift select lever is selected to the reverse "R" range, the valve spool of the manual valve 12 is displaced to a position shown in FIG. 9. In the reverse "R" range, the pressure control solenoid valve PCSV-A is duty controlled to an OFF state, as charted in FIG. 11 as the "REV" mode.

At this sate, all of the hydraulic pressure flowing along the drive pressure line 25 is interrupted, and hydraulic pressure fed to the manual valve 16 is directed to the first and second reverse control lines 48 and 50.

Accordingly, the hydraulic pressure flowing along the first reverse control line 48 is fed to the third friction member F/C via the front clutch valve 38 and, at the same time, to the release chamber of the second friction member K/D via the second-to-third/fourth-to-third speed shift control valve 40.

Further, hydraulic pressure flowing along the second reverse control line 50 via the N-R control valve 24 is fed to the fifth friction member L/R via the first-to-second speed shift valve 30, thereby accomplishing the reverse control.

During this reverse operation, when hydraulic pressure fed to between the sixth and fourth lands 92 and 88 from the manual valve 16, since the hydraulic pressure apply face of the sixth land 92 is larger than that of the fourth land 88, the valve spool of the pressure regulating vale 12 is slightly displaced towards the left.

Accordingly, since line pressure is regulated to be higher than that at the drive "D" range, it is enough to apply the third and fifth friction members, thereby driving the vehicle in reverse.

Operation of Skip Shifting from Fourth to Second Speed

To skip shift from the fourth to the second speed, as charted in FIG. 11 as the "4→2" operation mode, the TCU controls the shift control solenoid valve S1 to an ON state, and the shift control solenoid valve S3 to an OFF state.

Figure 10:
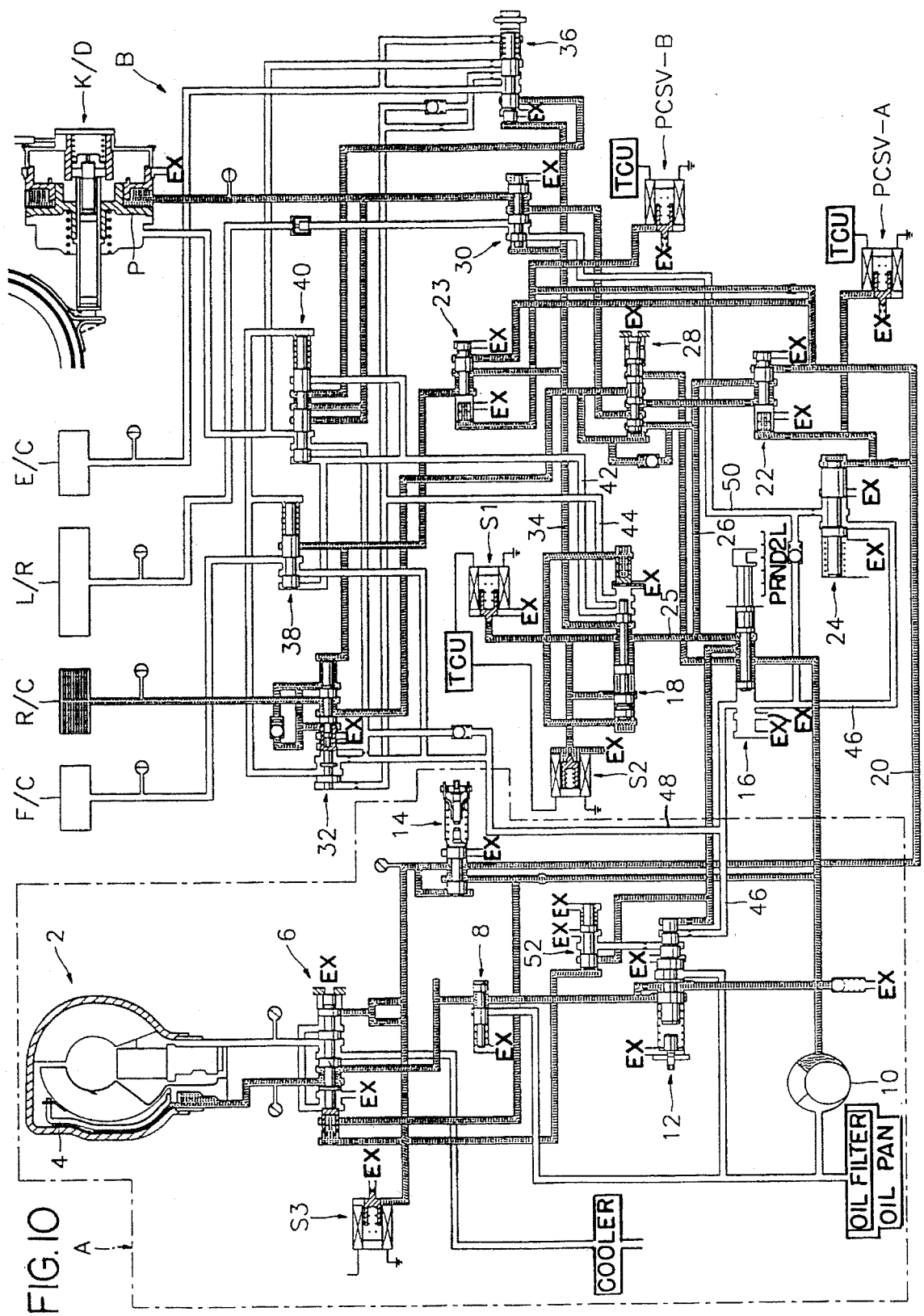
FIG. 10 is a view showing the location of hydraulic pressure when the hydraulic control system in accordance with the first embodiment of the present invention is at the skip shift from the fourth speed to the second speed.

By This control, as shown in FIG. 10, hydraulic pressure which has been fed to the third and fourth speed control lines 42 and 44 are interrupted, and hydraulic pressure which has been fed to the front clutch valve 38 and the second-to-third/fourth-to-third speed shift control vale 40 are also be interrupted.

Further, the TCU controls the pressure regulating solenoid vale PCSV-A according to the high duty ratio to reduce the hydraulic pressure at the first port 162 of the first pressure regulating valve 22, such that hydraulic pressure fed from the first speed control line 26 is interrupted.

By this operation, the hydraulic pressure which has been fed to the fourth friction member E/C is exhausted. Substantially, the exhaust timing point of the hydraulic pressure within the release chamber of the second friction member K/D is slightly retarded as compared to the exhaust timing point of the hydraulic pressure of the fourth friction member E/C.

To accomplish the second speed, the first friction member R/C should be applied. The application timing of the first friction member R/C is duty controlled by the pressure control solenoid valve PCSV-B.

That is, when the slip signal of the first friction member R/C is introduced to the TCU, the TCU immediately controls the pressure control solenoid valve PCSV-B to an OFF state according to the duty ratio to feed hydraulic pressure to the rear clutch exhaust valve 32 via the second pressure regulating valve 23 such that the valve spool of the rear clutch exhaust valve 32 is displaced towards the left to supply the hydraulic pressure within the first speed control line 26 to the first friction member R/C.

The hydraulic pressure control system according to the present invention as described above can alleviate shift shock by controlling the second friction member K/D and the third friction member F/C independently when the speed ratio changes from third speed to second speed.

Further, the hydraulic control system can improve responsiveness with respect to the gear shifting by providing a skip downshift from fourth speed to second speed.

Further, the hydraulic control system can reduce the drive loss of the hydraulic pump since excess hydraulic pressure is not fed by varying the line pressure.

FIG. 12 shows a hydraulic control system of an automatic transmission according to a second embodiment of the present invention.

The second-to-third/fourth-to-third speed shift valve 41 includes a first port 250 communicating with the third speed control line 42, a second port 252 for receiving control pressure from the rear clutch exhaust valve 32, a third port 254 communicating with the first reverse control line 48 to receive reverse pressure therefrom, and a fourth port 256 connected to the first-to-second speed shift valve 30 to receive hydraulic pressure therefrom.

The second-to-third/fourth-to-third speed shift valve 41 further includes a fifth port 258 communicating with the first port 250 to receive hydraulic pressure from the third speed control lien 42, and a sixth port 260 for feeding hydraulic pressure coming through the fifth port 258 to the end clutch valve 36 in accordance with the position of the valve spool.

The hydraulic pressure fed to the end clutch through the sixth port 260 stops there. This is for supplying the hydraulic pressure to the fourth friction member E/C when the port change of the end clutch valve 36 is not easy at the third speed.

Further, the fourth port 190 of the second pressure regulating valve 23 is connected to both the front clutch valve 38 and the end clutch valve 36 such that hydraulic pressure can be fed to the fourth friction member E/C without going by way of the second-to-third/fourth-to-third speed shift valve 40.

That is, in the first embodiment, the hydraulic pressure within the third speed control line 42 is fed to the fourth friction member E/C via the second-to-third speed shift valve 40 and the end clutch valve 36. However, in this second embodiment, the hydraulic pressure within the third speed control lien 42 is fed to the fourth friction member E/C via the end clutch valve 36. Accordingly, the skip shift operation from the fourth speed to the second speed becomes different from the first embodiment.

In this second embodiment, to perform the fourth-to-second skip shift, the TCU controls the shift control solenoid valve S1 to an OFF state to interrupt the flow of the hydraulic pressure within the fourth speed control line 44.

By this operation, hydraulic pressure which has been fed to the sixth port 241 of the end clutch valve 36 and third control hydraulic pressure which has been fed to the rear clutch exhaust valve 32, the front clutch valve 38 and the second-to-third/fourth-to-third speed shift valve 41 are all exhausted.

As a result, hydraulic pressure which has been fed to the fourth friction member E/C is exhausted through the exit port Ex via the end clutch valve 36 and the second-to-third/fourth-to-third speed shift valve 41.

At this point, the TCU controls the pressure control solenoid valve PCSV-B to an OFF state according to the duty ratio to displace the valve spool of the second pressure regulating valve 23 towards the right such that hydraulic pressure acts on the right face of the valve spool of the rear clutch exhaust valve 32.

By this operation, hydraulic pressure is fed to the first friction member R/C via the N-D control valve 28.

Further, the TCU controls the pressure control solenoid valve PCSV-A to an ON state according to the duty ratio to reduce hydraulic pressure which has been fed from the first pressure regulating valve 22 to the second friction member K/D.

Accordingly, no hydraulic pressure is fed to both the release and apply chambers of the second friction member K/D. At this state, when the first friction member R/C is applied, the TCU controls the shift control solenoid valve S2 from an OFF state to an ON state to exhaust hydraulic pressure from the fourth friction member E/C. Further, the pressure control solenoid valve PCSV-A is duty controlled to an OFF state to feed the hydraulic pressure stoping at the second port 168 of the first pressure regulating valve 22 to the second friction member K/D through the third port 170, thereby accomplishing the skip shifting from the fourth speed to the second speed.

Although, the shift operation between the fourth speed to the second speed is accomplished in turn as the solenoid valves S1 and S2 are controlled in turn by the TCU, since hydraulic pressure of the fourth friction member E/C is rapidly exhausted through the exit port Ex of the second-to-third/fourth-to-third speed shift valve, a gear train controlled by the hydraulic control system substantially has a same effect as the skip shifting from the fourth speed to the second speed.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A 4-speed automatic transmission for a vehicle, comprising:

a multiple stage gear mechanism driven by an engine;

a plurality of friction members for controlling a gear action of the gear mechanism;

a hydraulic pressure control system for selectively applying and releasing the friction members in accordance with a vehicle speed; and a transmission control unit for controlling an operation of the hydraulic pressure control system in accordance with the vehicle speed and a throttle valve opening; wherein the hydraulic pressure control system comprises a front clutch valve and a second-to-third/fourth-to-third speed shift valve both of which are simultaneously controlled in accordance with third speed signal pressure.

2. The 4-speed automatic transmission according to claim 1 wherein the hydraulic control system further comprises a manual valve responsive to a shift lever, a pressure regulating valve, and a rear clutch exhaust valve, wherein the front clutch valve comprises a first port communicating with a third speed control line to receive control pressure from the third speed control line, a second port connected to the pressure regulating valve to receive hydraulic pressure from the pressure regulating valve, a third port connected to the manual valve to receive hydraulic pressure form the manual valve in a reverse mode, and a fourth port connected to the rear clutch exhaust valve to receive hydraulic pressure from a fourth speed control line.

3. The 4-speed automatic transmission according to claim 1, wherein the hydraulic control system further comprises a first-to-second speed shift control valve, an end clutch valve, and a manual valve, wherein the second-to-third/fourth-to-third speed shift valve comprises first and second ports communicating with a third speed control line to receive control pressure from the third speed control line, a third port for feeding hydraulic pressure fed from the first-to-second speed shift valve to the end clutch valve, and a fourth port connected to the manual valve to receive hydraulic pressure from the manual valve at a reverse mode.

4. The 4-speed automatic transmission according to claim 2 wherein the hydraulic control system further comprises a pressure control solenoid valve which is controlled by the transmission control unit to control an apply timing of a first friction member of the friction members so as to perform a skip shifting from a fourth speed to a second speed.

5. The 4-speed automatic transmission according to claim 4, wherein the pressure control solenoid valve is controlled by the transmission control unit when a slip signal of the first friction member feeds back to the transmission control unit.

6. A hydraulic pressure control system of an automatic transmission for a vehicle, comprising:
 a damper clutch control part for controlling a damper clutch to increase power train efficiency;
 a pressure regulating part for regulating line pressure generated from a hydraulic pump; and
 a shift control part for selectively supplying hydraulic pressure regulated at the pressure regulating part to first, second, thirds and fourth friction members for applying more than one of the friction members in accordance with each speed ratio; wherein the shift control part comprises:
  a manual valve responsive to a shift lever;
  a shift control valve, controlled by two solenoid valves, for selectively feeding second, third, and fourth speed control pressures;

a first pressure regulating valve for feeding drive pressure fed from the manual valve to the first friction members;
 a first-to-second speed shift valve which is controlled by the second speed control pressure to feed drive pressure to the second friction member;
 a second pressure regulating valve for feeding the second speed control pressure to the third friction member; and
 a second-to-third/fourth-to-third speed shift valve controlled by the second speed control pressure to feed drive pressure to the fourth friction member.

7. The hydraulic pressure control system according to claim 6 wherein the second-to-third/fourth-to-third speed shift valve comprises a port for exhausting hydraulic pressure fed to the second friction member, the port communicating with an exit port of the manual valve.

8. The hydraulic pressure control system according to claim 6 further comprising a rear clutch exhaust valve, a front clutch valve, wherein the second-to-third/fourth-to-third speed shift valve, the rear clutch exhaust valve, and the front clutch valve communicate with each other to be controlled by fourth speed control pressure.

9. The hydraulic pressure control system according to claim 8 wherein the front clutch and second-to-third/fourth-to-third speed shift valves are controlled by third speed control pressure in a direction opposite to a direction when controlled by the fourth speed control pressure.

10. The hydraulic pressure control system according to claim 6, wherein the fourth friction member is connected via an end clutch valve to an exit port of the second-to-third/fourth-to-third speed shift valve.

11. The hydraulic pressure control system according to claim 6, the two shift control solenoid valves is controlled by the transmission control unit such that third and fourth speed control pressures are exhausted simultaneously to accomplish a skip shifting from a fourth speed to a second speed.

* * * * *